UNITED STATES PATENT OFFICE.

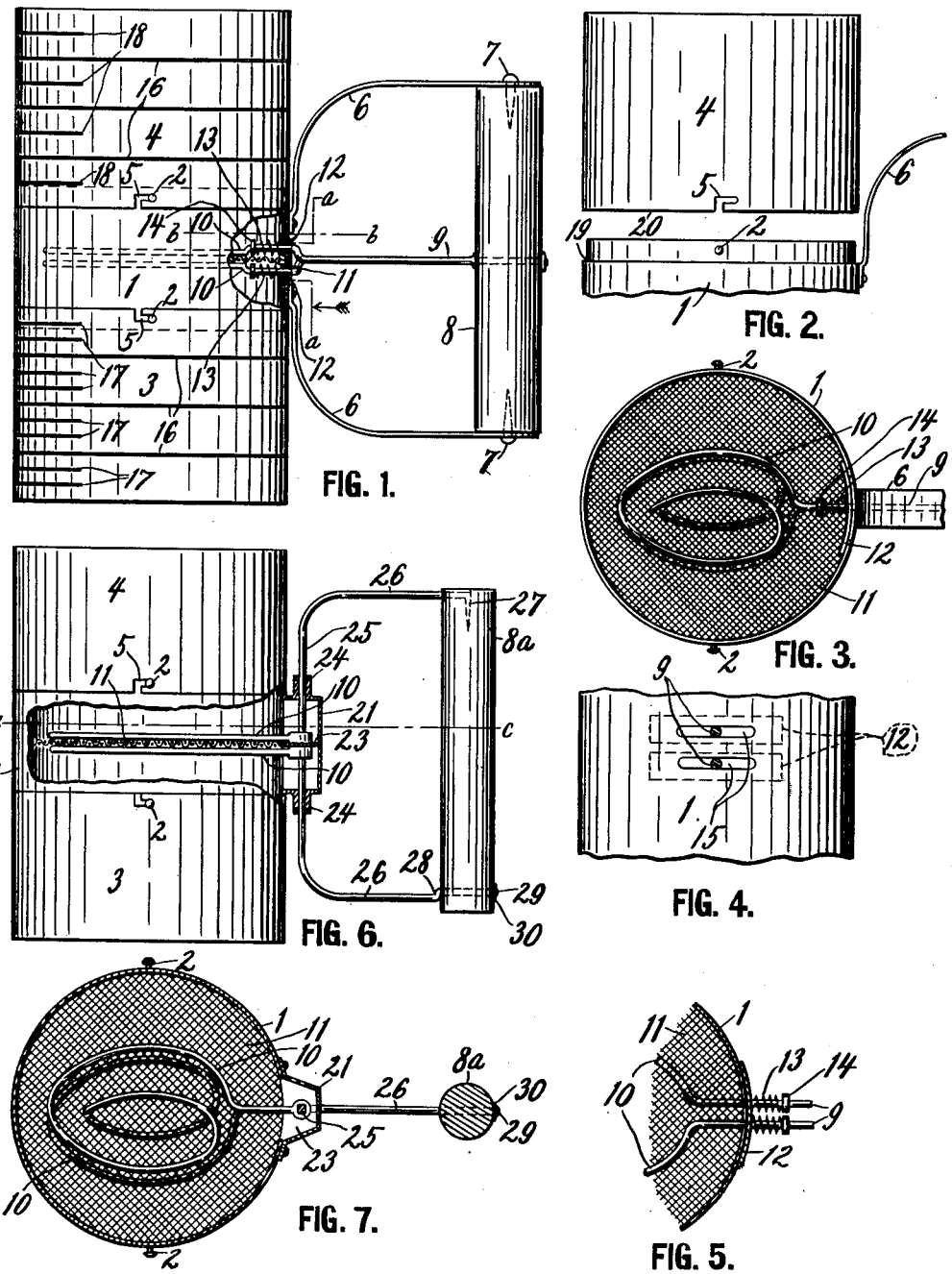

IDA M. NEWELL, OF MINNEAPOLIS, MINNESOTA, ASSIGNOR OF ONE-HALF TO HATTIE E. THOMPSON, OF MINNEAPOLIS, MINNESOTA.

FLOUR-SIFTER.

No. 909,649.     Specification of Letters Patent.     Patented Jan. 12, 1909.

Application filed March 30, 1908. Serial No. 424,271.

*To all whom it may concern:*

Be it known that I, IDA M. NEWELL, a citizen of the United States, residing at Minneapolis, in the county of Hennepin and State of Minnesota, have invented a new and useful Flour-Sifter, of which the following is a specification.

My invention relates to flour sifters, and the object is to provide an improved sifter by which the flour may be measured before sifted and then operated by one hand so as to thoroughly sift, work, and even mix the flour with the baking powder before it is used.

The above and other objects I attain by the novel construction and arrangement of parts illustrated in the accompanying drawing, in which—

Figure 1 is a side elevation of my improved flour sifter. Fig. 2 is the upper portion of Fig. 1 with the sections separated and marks of measure omitted. Fig. 3 is a top view of the middle section in Fig. 1 with the sieve omitted. Fig. 4 is a sectional view on the line *a—a* in Fig. 1. Fig. 5 is a section on line *b—b* in Fig. 1, with the arrangement of the agitators slightly modified. Fig. 6 is a modification of Fig. 1. Fig. 7 is a sectional view on line *c—c* in Fig. 6.

Referring to the drawings by reference numerals, it will be seen that the body or vessel of the device is composed of a middle section 1 having side pegs 2, and two similar end sections 3 and 4, having each two diametrically opposite L-shaped notches 5 engaging said pegs to hold the sections together.

In Figs. 1, 2 and 3, 6 are arms fixed upon one side of section 1 and pivotally secured at 7 to a wooden handle 8. Near the middle of said handle are fixed the shanks or arms 9 of two skeleton agitators 10, which are positioned one close above and the other close below the sieve 11, fixed in the middle of section 1. Each arm 9 fits snugly in a hole in a plate 12 which is pressed against the side of the section by a spring 13 and collar 14 so as to keep closed the slots 15 therein, in which the arms 9 swing when the handle 8 is grasped and the vessel swung from side to side by it, whereby the agitators are caused to work by the motion of the sieve. Said plates and springs may be within the vessel as in Figs. 1, 2 and 3, or outside the vessel as in Fig. 5.

The section 3 is graduated by marks 16 for each cup of flour put into it and each cup is sub-divided into three equal parts by the marks 17, while the section 4 is divided by marks 16 for each cup and marks 18 dividing each cup into halves.

In the use or operation of the device either section 3 or section 4 is detached and after filling into it the required amount of flour, and perhaps the baking powder with it, section 1 is placed in position with the shoulder 19 (see Fig. 2) against the edge 20 of the detached section and by a turning movement of either or both sections the pins 2 are forced into catching engagement in the notches 5. The handle is then grasped and the vessel shaken or swung from side to side until the entire contents have gone through the sieve; the handle is then inverted in the hand and the shaking of the vessel continued until the contents have passed through the sieve as many times as desired, until the contents are fully worked and mixed when it is emptied out of either section 3 or section 4, which is then for that purpose detached. Should there be any stones, sticks or the like in the flour they may be removed from the face of the sieve at any time during the process of sifting, by removing the end sections 3 and 4 one at a time while each one is alternately empty.

In the modification shown in Figs. 6 and 7, the section 1 has an abutment chamber 21 with a partition 23 and tubular bearings 24 in which is journaled a rock-shaft 25 having the agitators 10 affixed to it. The ends of the rock shaft are secured by arms 26 to the ends of the wooden handle 8$^a$ in any suitable manner, one of which is shown in the upper end of the handle where the arm 26 is formed with a prong 27 driven into the handle, and another form is shown in the lower end of the handle, where the arm 26 is offset at 28, inserted through the handle and riveted over at 29 on a washer 30. The long bearings 24 both prevent quick wear and keep the opening for the shaft tight against leakage of flour.

Having thus described my invention, what I claim is:—

1. A reversible flour sifter comprising a vessel or receptacle divided into a ring-shaped bottomless middle section, and two end sections each with bottom and having their open ends detachably connected with the ends of the middle section; said middle section having a flat sieve fixed in the middle of it and two parallel slots in one side of it, and adjacent thereto two handle arms, a handle extending between the handle arms and having its ends journaled therein, an agitator upon each face of the sieve and provided each with a rocker arm extending through one of the slots and secured in the handle, a plate carried by each rocker arm and closing the slot in which the arm moves, to prevent leakage of flour therethrough.

2. A reversible flour sifter comprising a vessel or receptacle divided into a ring-shaped bottomless middle section, and two end sections, each with bottom and having their open ends detachably connected with the ends of the middle section; said middle section having a flat sieve fixed in the middle of it and two parallel slots in one side of it, and adjacent thereto two handle arms, a handle extending between the handle arms and having its ends journaled therein, an agitator upon each face of the sieve and provided each with a rocker arm extending through one of the slots and secured in the handle, a plate carried by each rocker arm and closing the slot in which the arm moves, to prevent leakage of flour therethrough, a spring carried by each rocker arm and tending at all times to press the plate against the side of the vessel for the purpose set forth.

3. A reversible flour sifter comprising a vessel or receptacle divided into a ring shaped bottomless middle section, and two end sections each with bottom and having their open ends detachably connected with the ends of the middle section; said middle section having a flat sieve fixed in the middle of it and two parallel slots in one side of it, and adjacent thereto two handle arms, a handle extending between the handle arms and having its ends journaled therein, an agitator upon each face of the sieve and provided each with a rocker arm extending through one of the slots and secured in the handle, a plate carried by each rocker arm and closing the slot in which the arm moves, to prevent leakage of flour therethrough, a spring carried by each rocker arm and tending at all times to press the plate against the side of the vessel for the purpose set forth, and a collar on the arm to give tension to the spring.

4. A reversible flour sifter comprising a vessel or receptacle divided into a ring shaped bottomless middle section, and two end sections each with bottom and having their open ends detachably connected with the ends of the middle section; said middle section having a flat sieve fixed in the middle of it and two parallel slots in one side of it, and adjacent thereto two handle arms, a handle extending between the handle arms and having its ends journaled therein, an agitator upon each face of the sieve and provided each with a rocker arm extending through one of the slots and secured in the handle, a plate carried by each rocker arm and closing the slot in which the arm moves, to prevent leakage of flour therethrough, a spring carried by each rocker arm and extending at all times to press the plate against the side of the vessel for the purpose set forth, said plates and springs being located inside of the said middle section to enable the pressure of the flour to assist in keeping the plates closed.

In testimony whereof I affix my signature, in presence of two witnesses.

IDA M. NEWELL.

Witnesses:
Louis H. Joss,
Victor M. Petersen.